(12) United States Patent
Liao

(10) Patent No.: US 7,121,563 B1
(45) Date of Patent: Oct. 17, 2006

(54) GOLF CART FRONT-WHEEL COLLAPSING DEVICE

(75) Inventor: Gordon Liao, Tainan Hsien (TW)

(73) Assignee: Unique Products & Design Co., Ltd., Yung Kang (TW)

( * ) Notice: Subject to any disclaimer, the term of this patent is extended or adjusted under 35 U.S.C. 154(b) by 0 days.

(21) Appl. No.: 11/085,571

(22) Filed: Mar. 22, 2005

(51) Int. Cl.
  *B62B 1/00* (2006.01)
(52) U.S. Cl. .............. 280/47.22; 280/47.16; 280/47.17; 280/47.26; 280/655
(58) Field of Classification Search ............ 280/47.16, 280/47.17, 47.2, 47.21, 47.22, 47.26, 651, 280/655, 652, 654, 646, 47.27, 62, 645, 47.23
See application file for complete search history.

(56) References Cited

U.S. PATENT DOCUMENTS

| | | | |
|---|---|---|---|
| 5,028,061 A * | 7/1991 | Hawkes | 280/47.4 |
| 5,765,857 A * | 6/1998 | Hsiao | 280/646 |
| 6,152,465 A * | 11/2000 | Shieh | 280/62 |
| 6,345,836 B1 * | 2/2002 | Wu | 280/654 |
| 6,719,319 B1 * | 4/2004 | Liao | 280/654 |
| 6,811,162 B1 * | 11/2004 | Liao | 280/47.2 |
| 6,886,852 B1 * | 5/2005 | Cheng et al. | 280/651 |
| 2003/0122353 A1 * | 7/2003 | Liao | 280/651 |
| 2004/0135331 A1 * | 7/2004 | Liao | 280/47.2 |
| 2005/0046130 A1 * | 3/2005 | Cheng et al. | 280/47.26 |
| 2005/0173895 A1 * | 8/2005 | Lin | 280/651 |
| 2005/0269803 A1 * | 12/2005 | Wu | 280/651 |

* cited by examiner

*Primary Examiner*—J. Allen Shriver
(74) *Attorney, Agent, or Firm*—Alan D. Kamrath; Nikolai & Mersereau, P.A.

(57) ABSTRACT

A golf cart front-wheel collapsing device includes two parallel lower tubes, two stationary annular gears, a rotary cylindrical gear, a switch and a front wheel. The lower tubes are fixed under a golf cart frame, having a lower end combined with each stationary annular gear, with the cylindrical gear located between the stationary annular gears, and with a coil spring located respectively between each stationary annular gear and the cylindrical gear. The switch is positioned in one of the stationary gears for securing other components in place and operated to engage and disengage the stationary gears with and from the cylindrical gear, letting the front wheel removably combined with the cylindrical gear able to be expanded or folded for collapsing this device, also adjusting the front-wheel's angle to suit to users of different heights.

8 Claims, 17 Drawing Sheets

GOLF CART FRONT-WHEEL COLLAPSING DEVICE

BACKGROUND OF THE INVENTION

1. Field of the Invention

This invention relates to a golf cart front-wheel collapsing device, particularly to one collapsible to become a small size for convenience of handling, storing and carrying, and having the functions of angle adjusting of the front wheel and of height adjusting of the height of the grip from the ground for suiting to the height of a user.

2. Description of the Prior Art

A conventional golf cart shown in FIGS. 1 and 2, includes a front wheel 11, which has to be folded up between the two rear wheels 12 before collapsing it, so the grip 13 is prevented from being folded inward, impossible to be collapsed. Then the conventional golf cart has a collapsed size substantially large, inconvenient to be stored or carried.

SUMMARY OF THE INVENTION

One purpose of the invention is to offer a golf cart front-wheel collapsing device possible to collapse the front wheel to make a golf cart into a small size for convenience of storing and carrying.

Another purpose of the inventin is offer a golf cart front-wheel collapsing device possible to adjust the angle of the front wheel and also the height of the grip to suit to users of different heights.

The golf cart front-wheel collapsing device includes two parallel lower tubes, two stationary annular gears, a rotary cylindrical gear, a switch and a front wheel. The two lower tubes are fixed under a golf cart frame, having a lower end bent forward and passing through the two stationary annular gears. The rotary cylindrical gear is located between the two stationary annular gears, and a coil spring is located between each stationary annular gear and the rotary cylindrical gear. The switch is fixed in one of the two stationary annular gear, having a trigger able to be pulled up and down for operating the switch and a lateral elongate bar extending through the two stationary annular gears and the rotary cylindrical gear and the two coil springs for tightening those annular gears with the cylindrical gear for engaging them together or loosening them from each other. Then the front wheel can be folded in between the two lower tubes, and also be adjusted its angle against the ground and lets the height of the grip of a golf cart adjustable

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
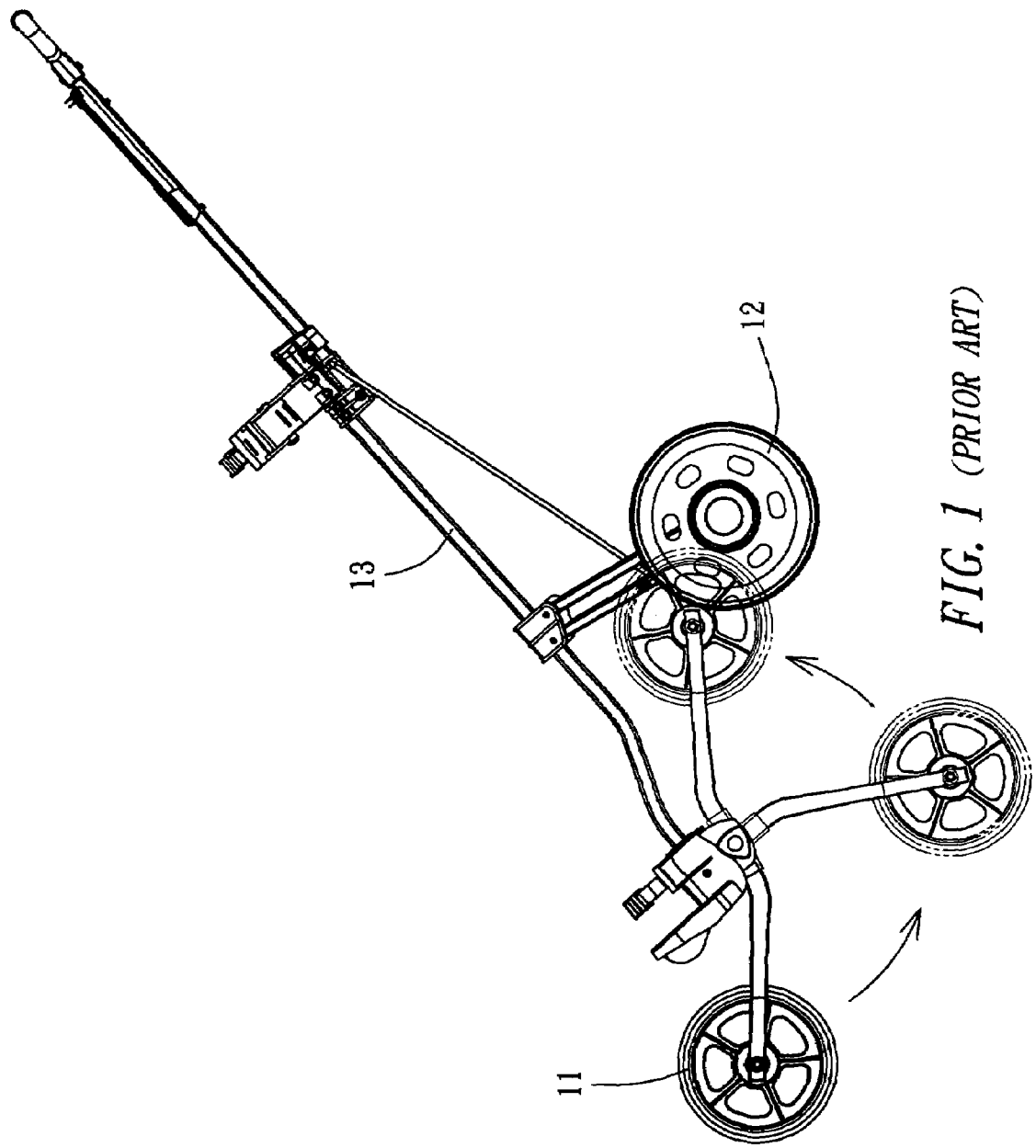
FIG. 1 is a perspective view of a conventional golf cart.
Figure 2:
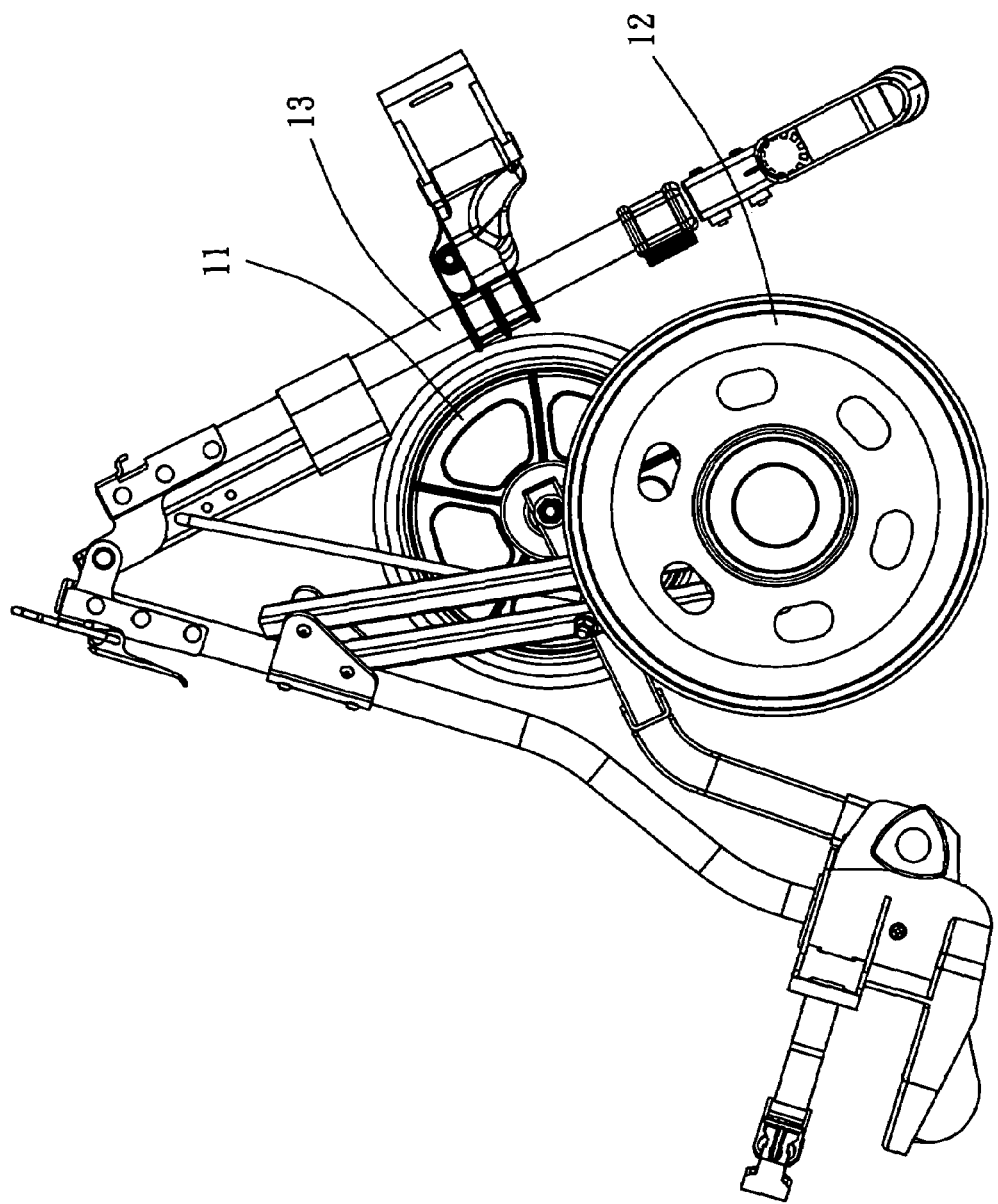
FIG. 2 is a perspective view of the conventional golf cart collapsed.
Figure 3:
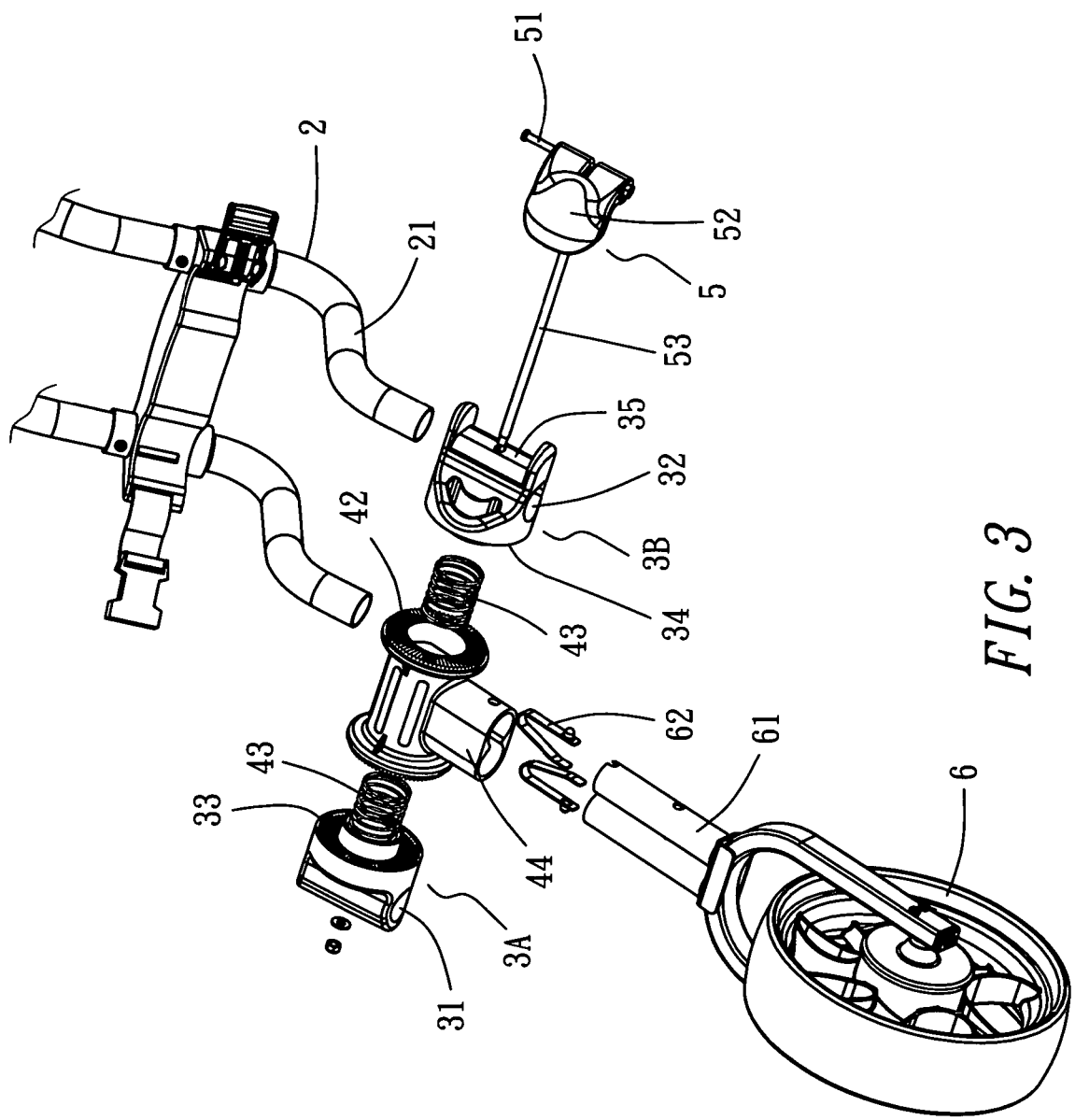
FIG. 3 is an exploded perspective view of a first embodiment of a golf cart front-wheel collapsing device in the present invention.
Figure 4:
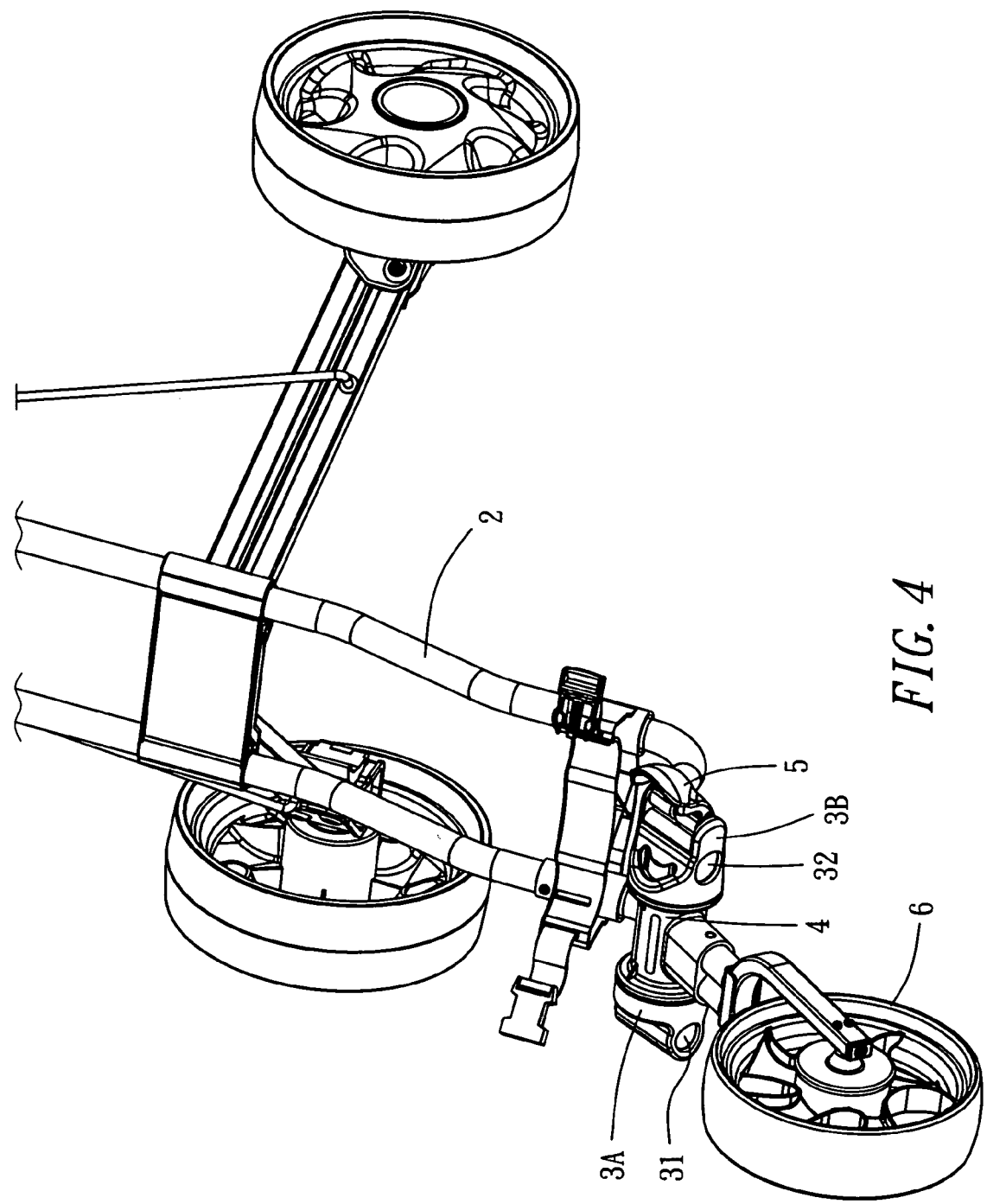
FIG. 4 is a perspective view of the first embodiment of a golf cart front-wheel collapsing device in the present invention.
Figure 5:
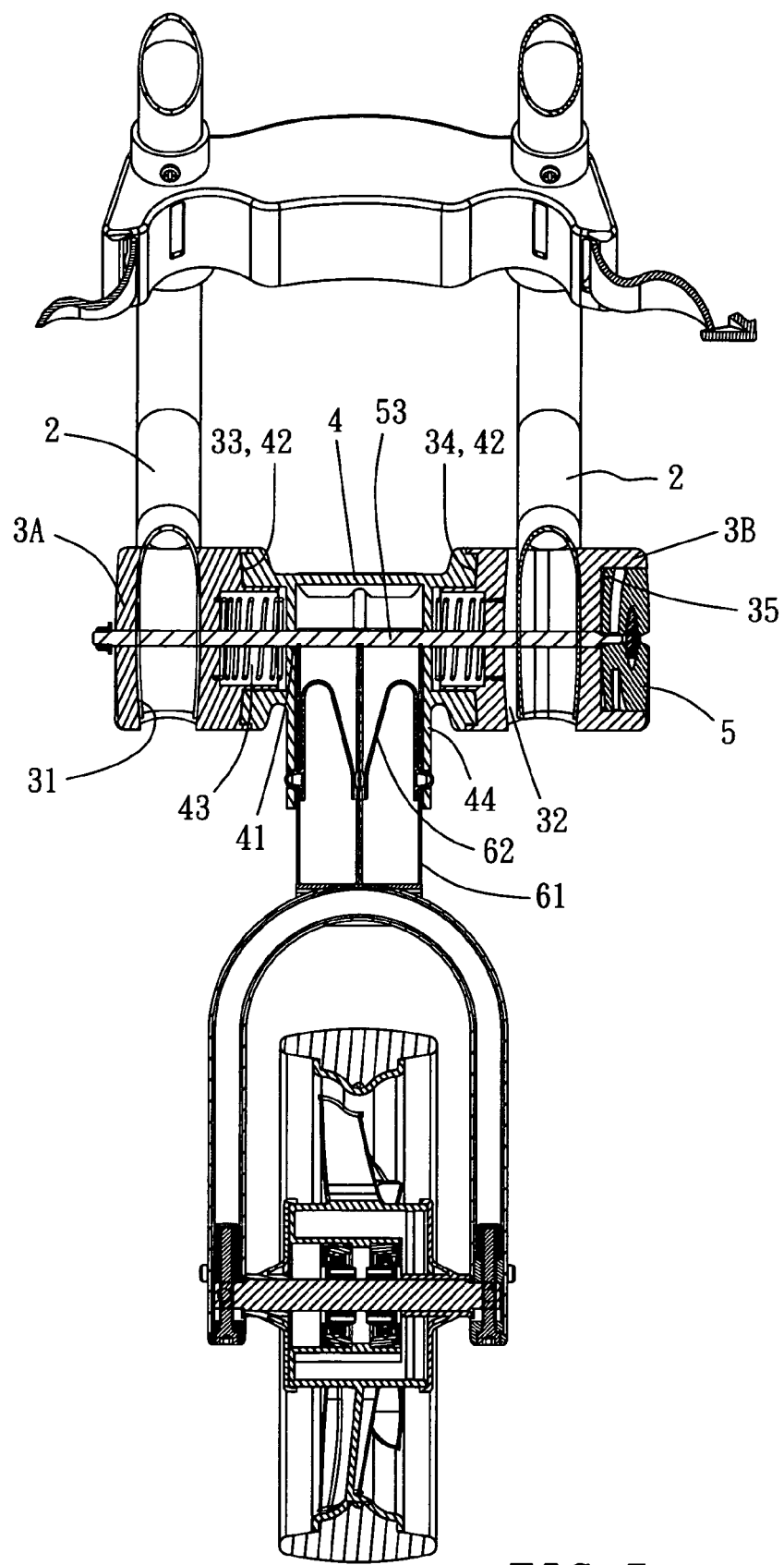
FIG. 5 is a lengthwise cross-sectional view of the first embodiment of a golf cart front-wheel collapsing device in the present invention.

A first embodiment of a golf cart front-wheel collapsing device in the present invention, as shown in FIGS. 3, 4 and 5, includes a pair of parallel lower tubes 2, two stationary annular gears 3A. 3B respectively fixed with the two lower tubes 2, a rotary cylindrical gear 4 located between and engaging with and disengaging from the two stationary annular disc gears 3A and 3B, a switch 5 connected with the lower tubes 2, the two stationary disc gears 3A, 3B and the cylindrical gear 4, and a front wheel 6 connected with the cylindrical gear 4.

The two parallel lower tubes 2 are fixed under a golf cart frame, possible to have a round or squire cross-section, bent to the front side and provided with an intermediate horizontal stage 21 for receiving the bottom of a golf rod bag 7.

The two stationary disc gears 3A, 3B are respectively provided with a round hole 31 and a oval hole 32 (or a square hole and a rectangular) for the two lower tubes 2 to pass through, many continual teeth 33 and 34 on an inner annular surface, and a recess 35 only formed in the right stationary annular gear 3B.

The cylindrical gear 4 is provided with a transverse hole 41, many annular continual teeth 42 respectively formed in two opposites sides, two coil springs 43 respectively fitted through the two opposite sides, and a cylinder 44 extending downward.

The switch 5 has a pivotal shaft 51 pivotally connected with the recess 35 of the right stationary disc gear 3B, and an eccentric trigger 52, an lateral elongate bar 53 extending through the two lower tubes 2, the two stationary annular gears 3A, 3B and the rotary cylindrical gear 4 transversely with the two coil springs 43 respectively positioned stably between the two stationary annular gears 3A, 3B and the cylindrical gear 4.

The front wheel 6 is supported by a wheel supporter 61, which has two V-shaped springs 62 inserted in the cylinder 44 of the rotary cylindrical gear 4 for stably connecting the wheel supporter 61 with the front-wheel collapsing device.

The teeth 33, 34 and 42 of the two stationary annular gears 3A, 3B and the rotary cylindrical gear 4 can be altered in the number and shape according to practical needs.

Figure 6:
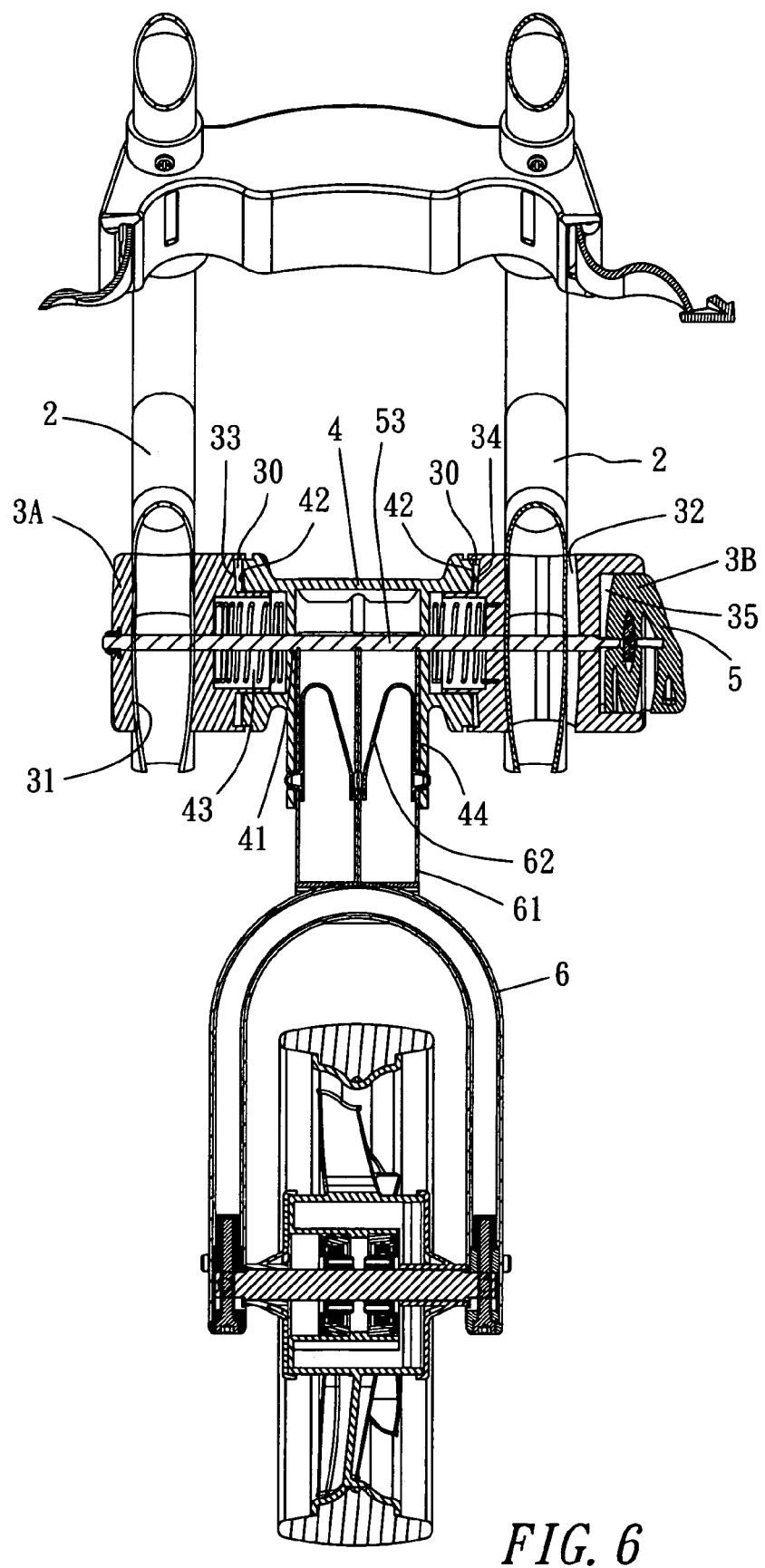
FIG. 6 is another lengthwise cross-sectional view of the first embodiment of a golf cart front-wheel collapsing device in the present invention.
Figure 7:
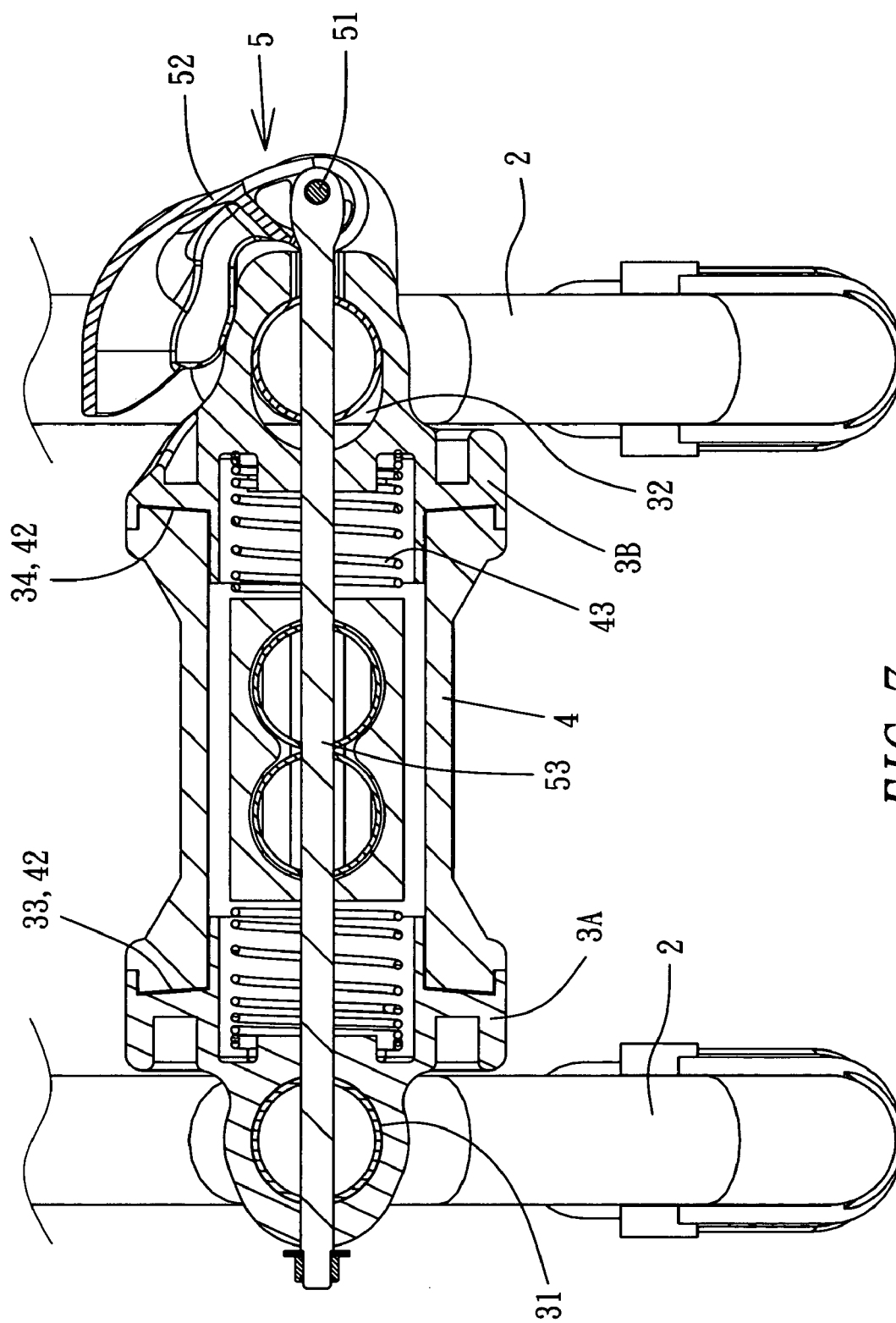
FIG. 7 is a transverse cross-sectional view of the first embodiment of a golf cart front-wheel collapsing device in the present invention.
Figure 8:
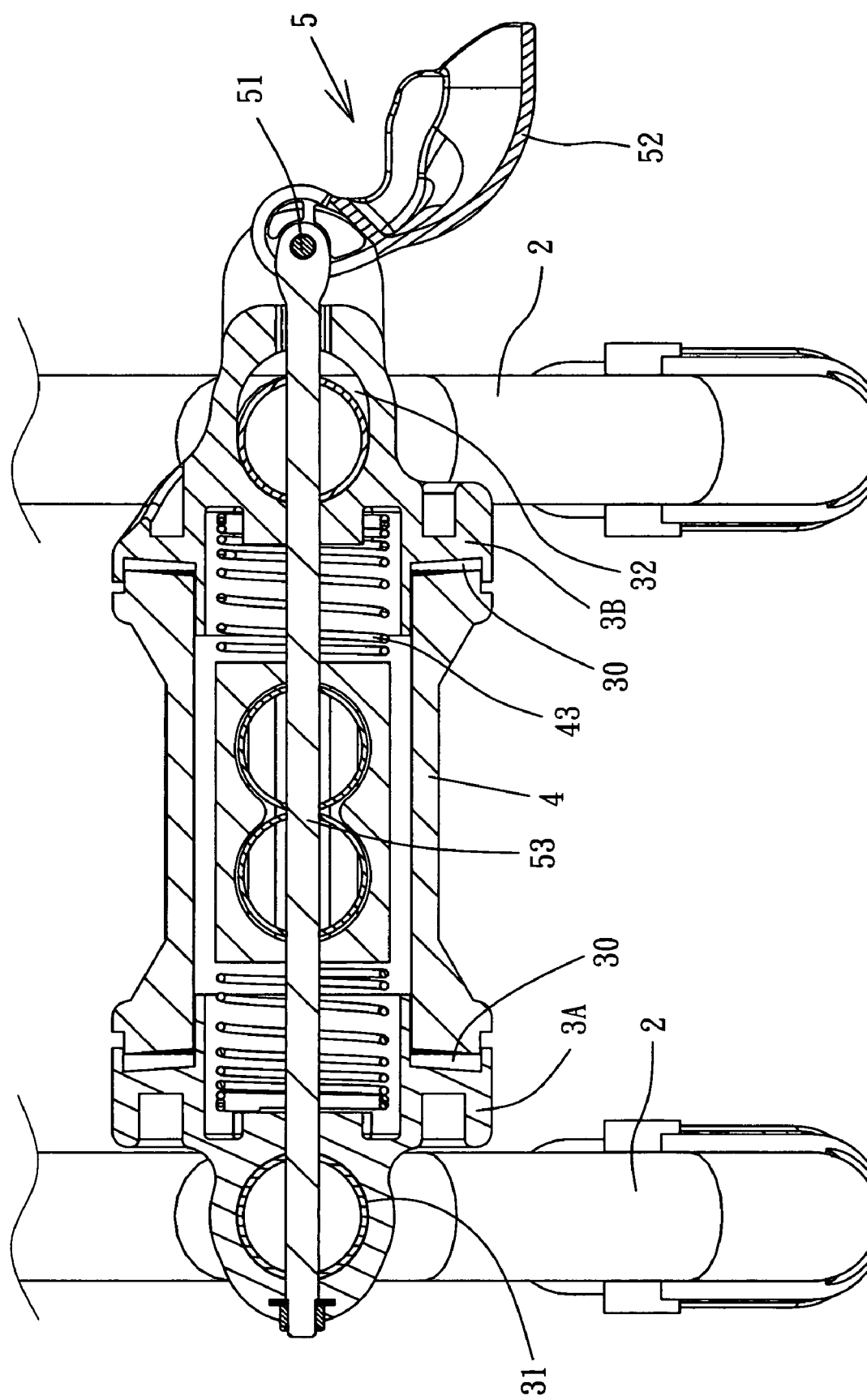
FIG. 8 is another transverse cross-sectional view of the first embodiment of a golf cart front-wheel collapsing device in the present invention.
Figure 9:
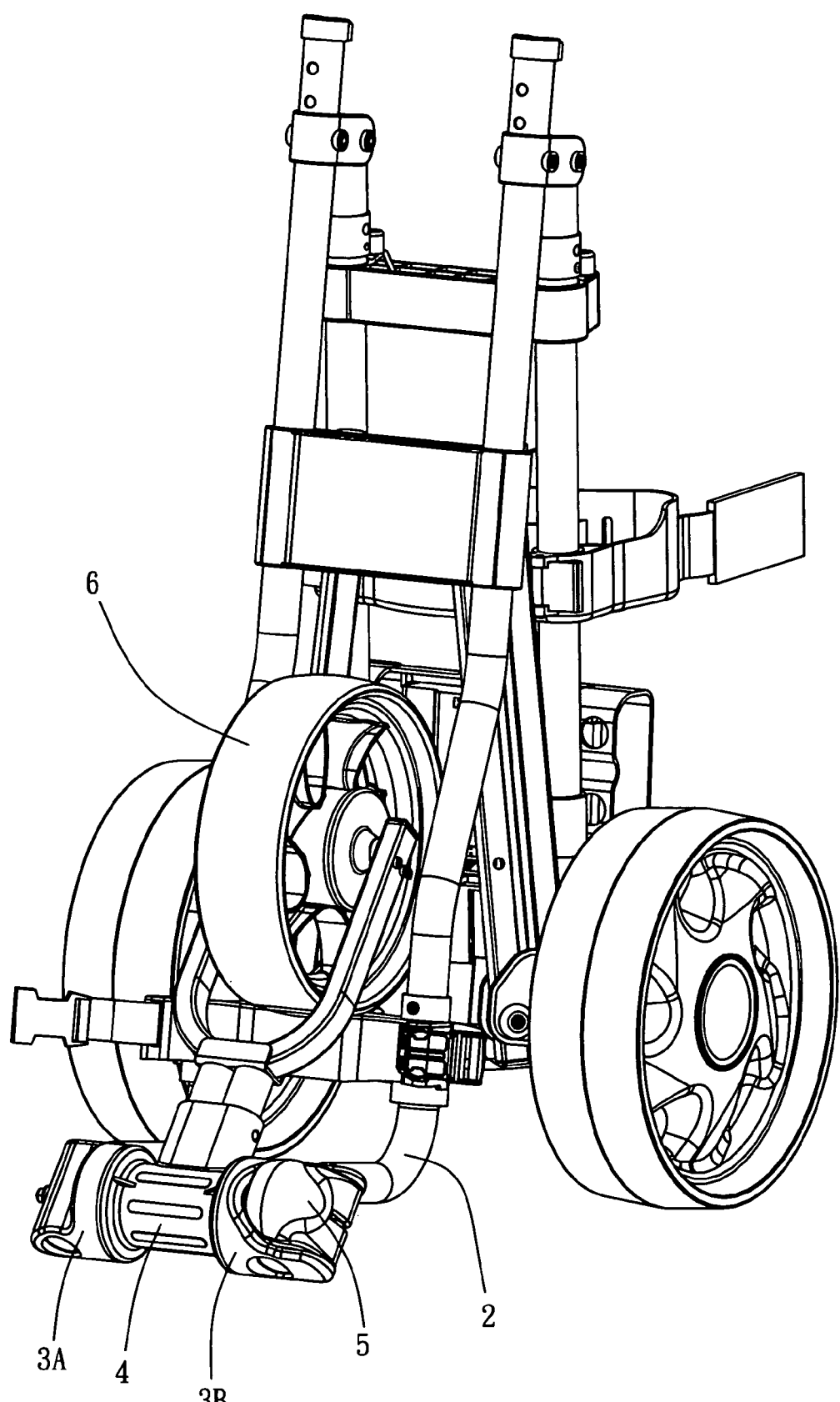
FIG. 9 is a perspective view of a golf cart with the first embodiment of a front-wheel collapsing device in the collapsed condition in the present invention.
Figure 15:
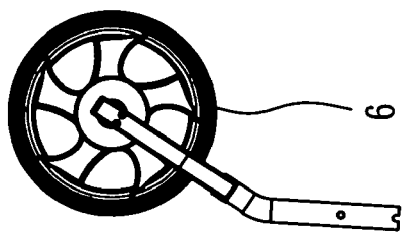
FIG. 15 is a side view of the golf cart with the second embodiment of a front-wheel collapsing device in the present invention, showing it in the collapsed condition.
Figure 15:
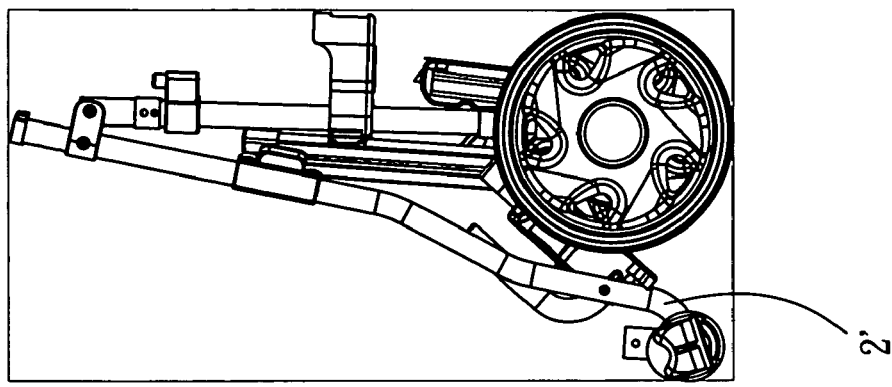
Figure 10:
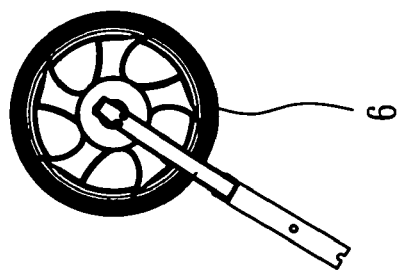
FIG. 10 is a side view of a golf cart with the first embodiment of a front-wheel collapsing device in the collapsed condition in the present invention.
Figure 10:
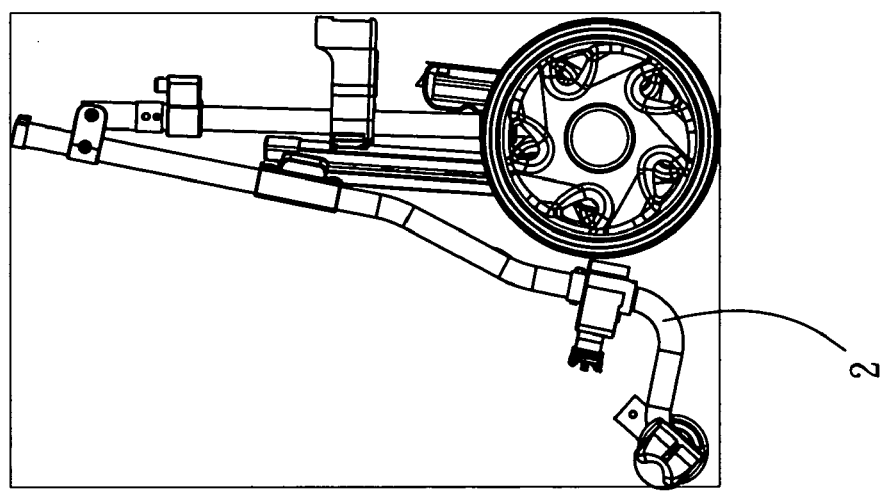

After the front-wheel collapsing device in the invention has been assembled together, referring to FIGS. 5, 6, 7 and 8, the two stationary annular gears 3A, 3B engage respectively the two side annular gears of the rotary cylindrical gear 4 after the front wheel 6 is expanded, with the two coil springs 43 constricted at the same time, and with the switch 5 tightly pressed by the trigger 52, as shown in FIGS. 5 and 7. But if the trigger 52 is pulled down or released, the stationary annular gear 3B is shifted by the recovering resilience of the two coil springs 43 owing to the oval hole 32, so the two stationary annular gears 3A, 3B respectively may disengage from the two side annular gears of the rotary cylindrical gear 4, forming a gap 30 as shown in FIGS. 6 and 8. In this position, the front wheel 6 can be lifted upward with the rotary cylindrical gear 4 as a shaft to move into the space between the two lower tubes 2, or collapsed as shown in FIG. 9. Otherwise, the front wheel 6 can be pulled off the rotary cylindrical gear 4 as shown in FIG. 10.

Next, if the front wheel 6 is to be expanded for using the golf cart, the trigger 52 of the switch 5 is swung up to push the stationary annular gear 3B inward so that the two stationary annular gears 3A. 3B may engage the rotary cylindrical gear 4 to expand the front-wheel collapsing device again as shown in FIGS. 5 and 7. Obviously, the handling of the front-wheel collapsing device is very quick and easy.

Figure 12:
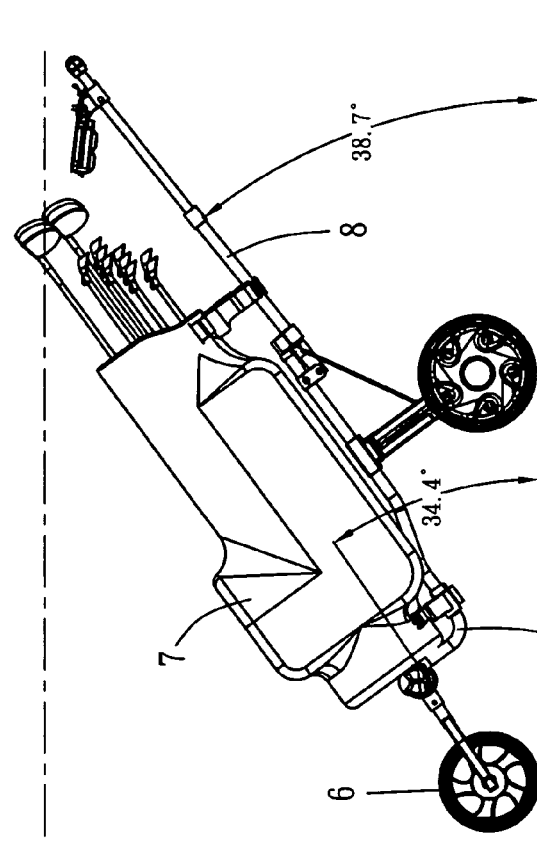
FIG. 12 is a side view of the golf cart with the first embodiment of a front-wheel collapsing device in the present invention, showing it in a used condition.
Figure 11:
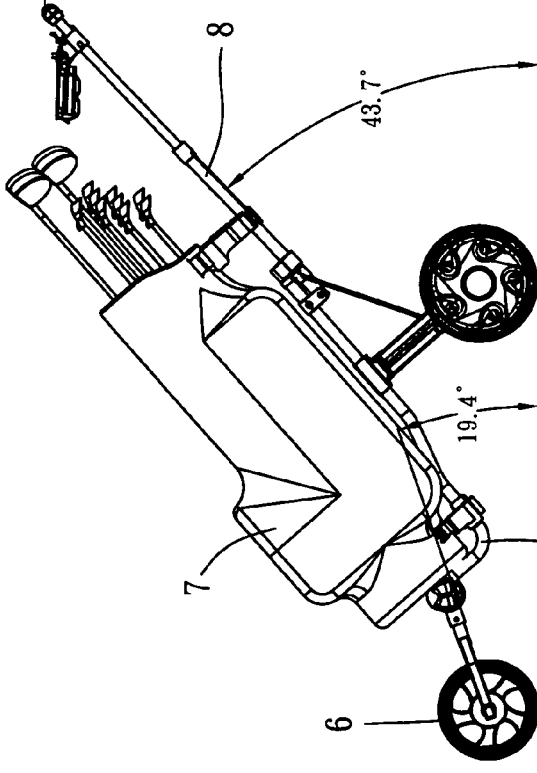
FIG. 11 is a side view of the golf cart with the first embodiment of a front-wheel collapsing device in the present invention, showing it in a used condition.

Further, a golf cart carrying a golf club bag 7 is to be used in a golf link, the switch 5 or the trigger 52 is pulled down is pulled down, to loosen the engagement of the two stationary annular gears 3A, 3B from the rotary cylindrical gear 4, so as to adjust the angle of the front wheel 6 against the ground so the grip 8 can be adjusted in its height from the ground, as shown in FIGS. 11 and 12, letting the golf cart usable by users having different heights. Thus, the front-wheel collapsing device also has functions of adjusting the angle of the front wheel and of the height of the grip for users of different heights to use comfortably.

Figure 13:
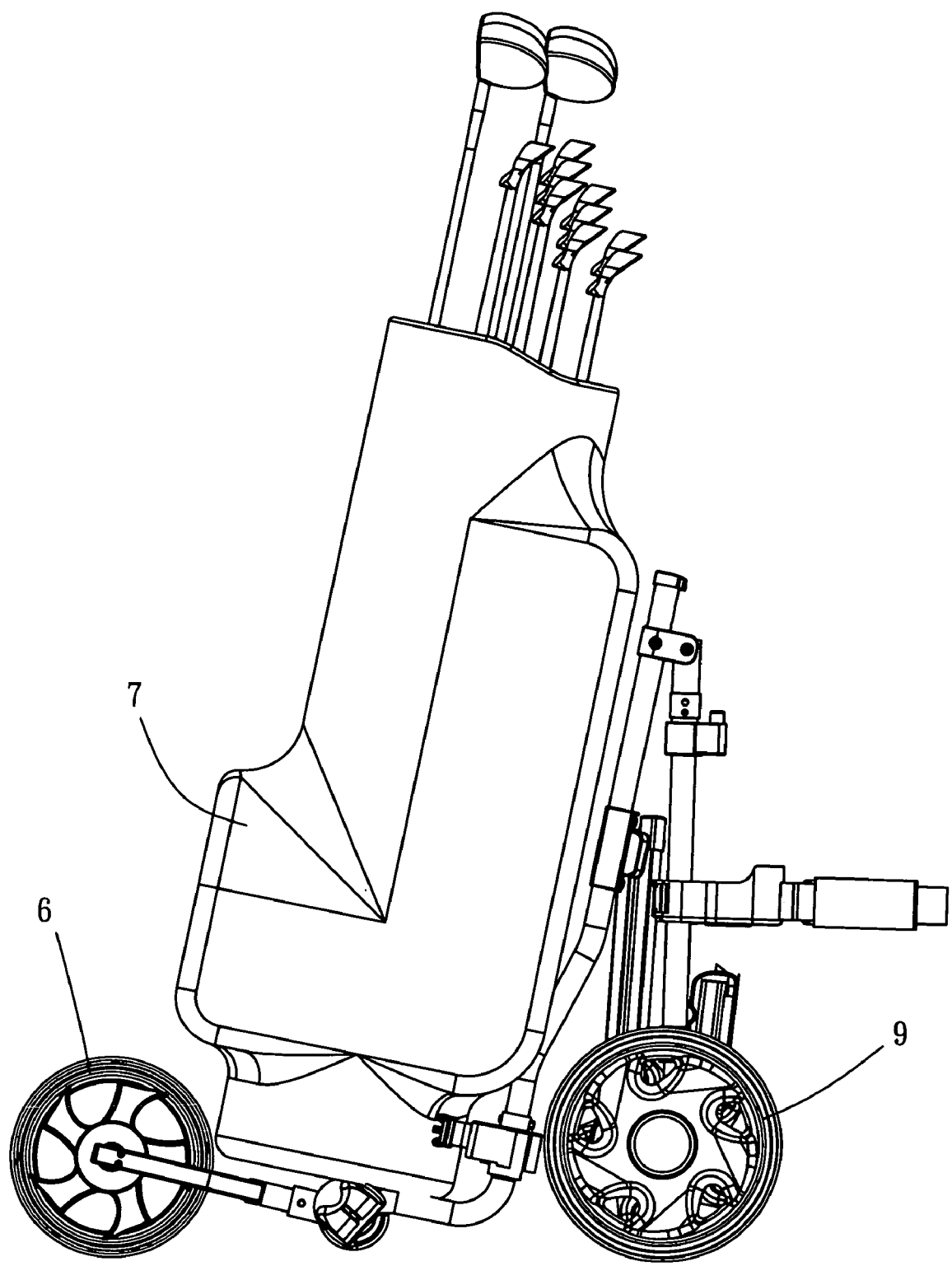
FIG. 13 is a side view of the golf cart with the first embodiment of a front-wheel collapsing device in the present invention, showing it in a half collapsed condition.

Next, if the golf club bag 7 is still placed on the golf cart with the front-wheel collapsing device collapsed only half and not completely as shown in FIG. 13 by adjusting the angle of the front wheel 6 as described above, the front wheel 6 and the two rear wheels 9 can be kept still not touching the ground to secure stably the golf cart on the ground, not falling down. And when it is collapsed completely as shown in FIGS. 9 and 10, its size becomes vary small, convenient for storing and carrying around.

Figure 14:
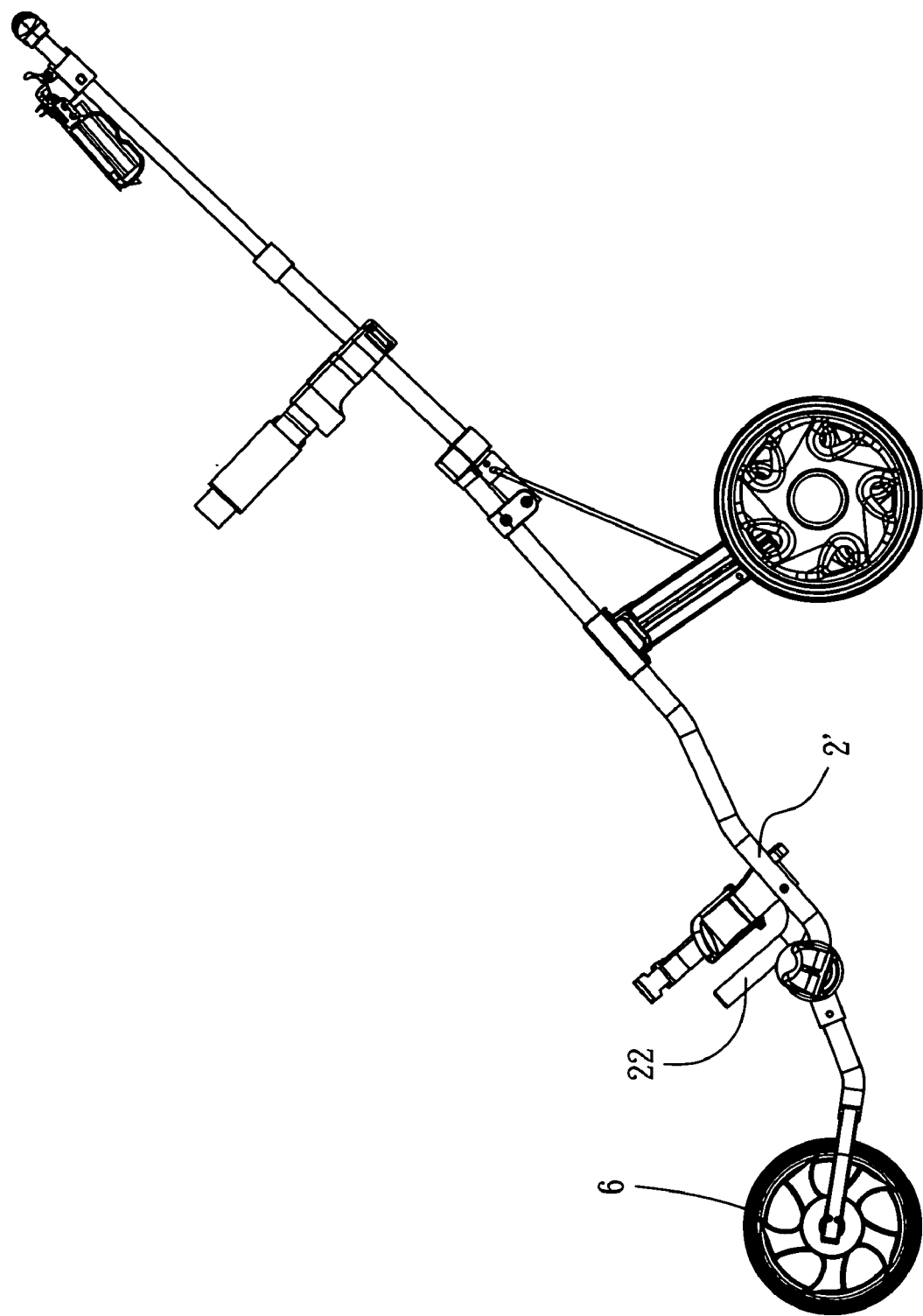
FIG. 14 is a perspective view of a golf cart with a second embodiment of a front-wheel collapsing device in the present invention.
Figure 16:
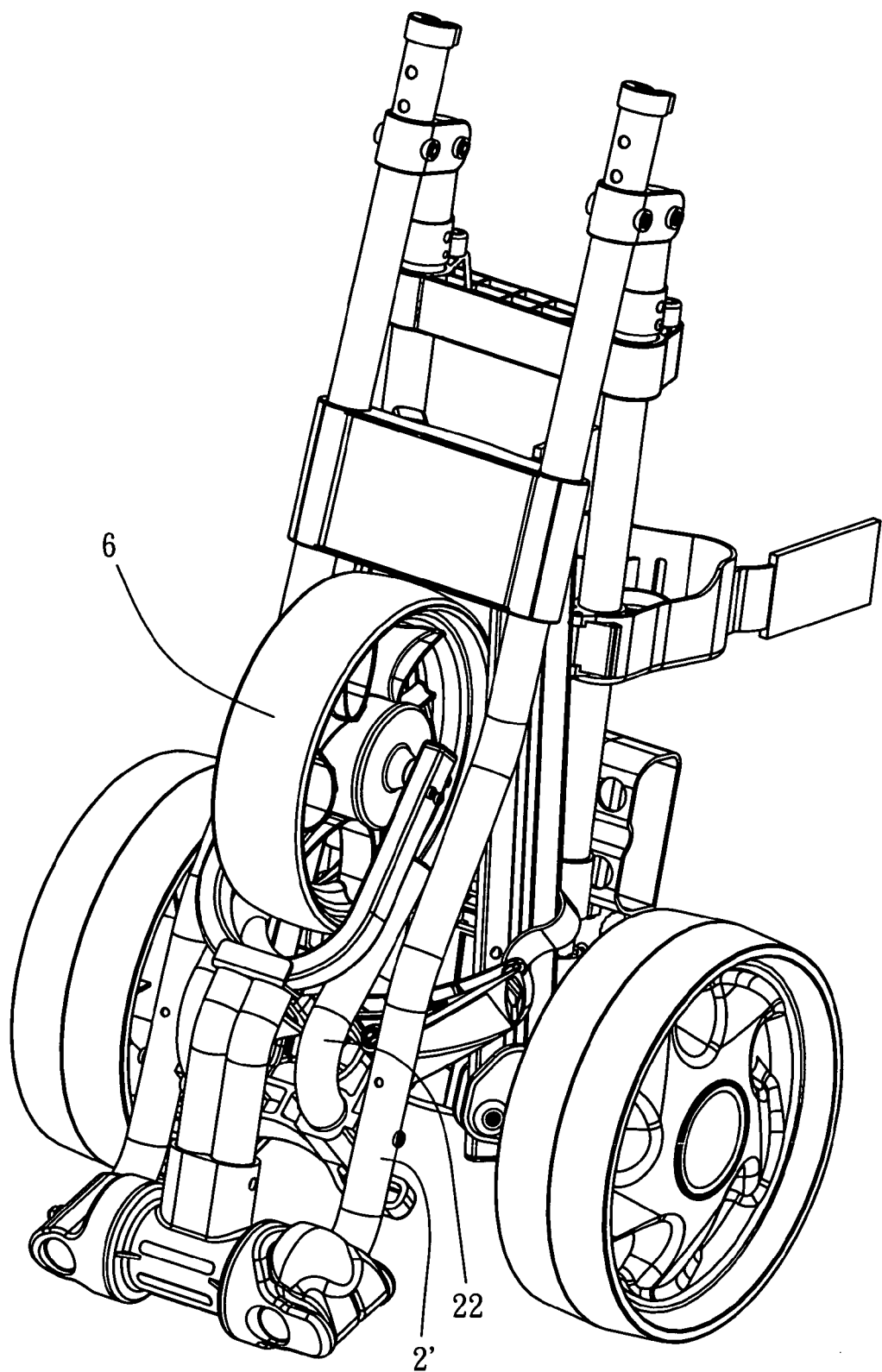
FIG. 16 is a perspective view of a golf cart with the second embodiment of a front-wheel collapsing device in the present invention.
Figure 17:
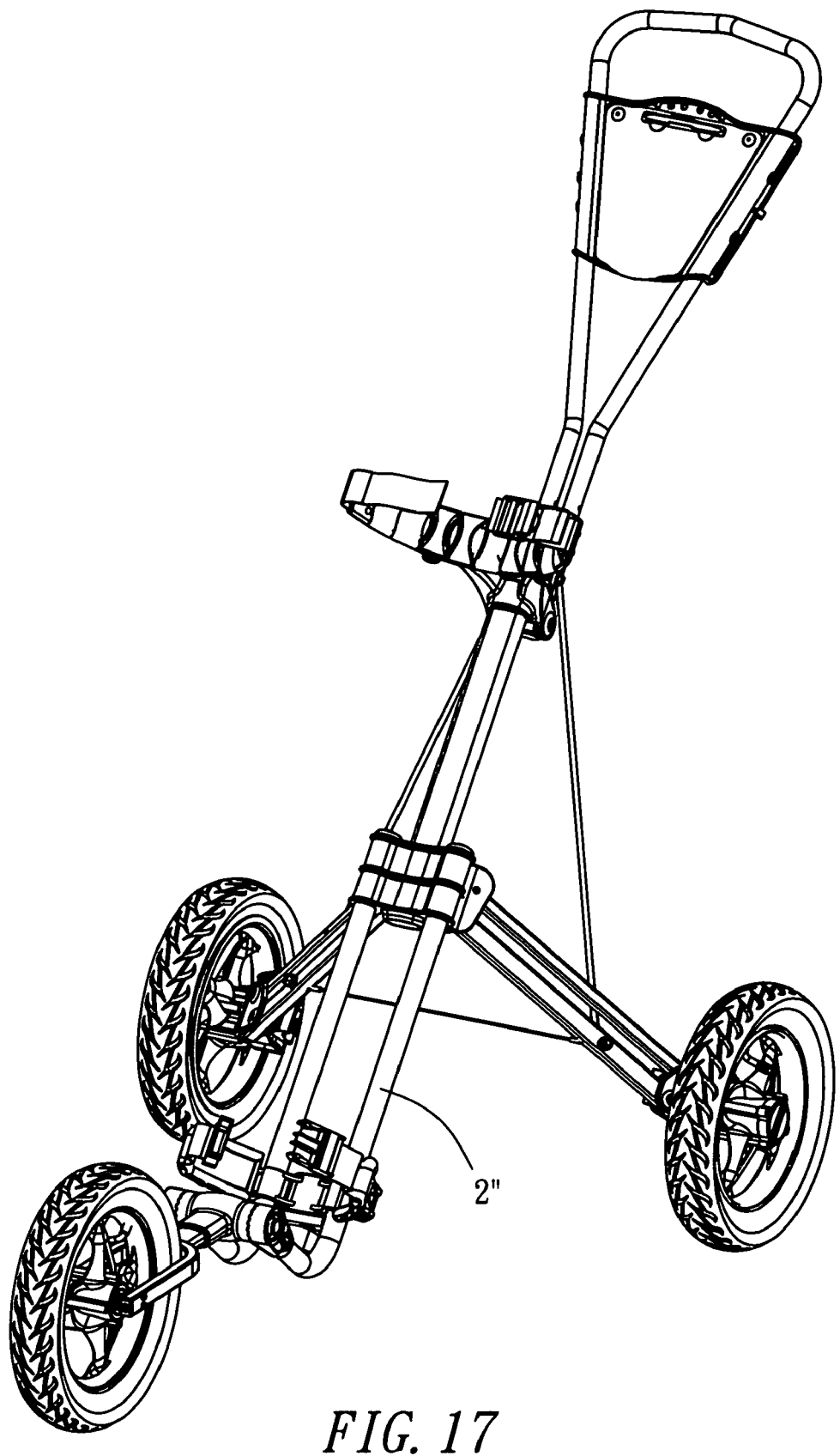
FIG. 17 is a perspective view of a golf cart with a third embodiment of a front-wheel collapsing device in the present invention.
Figure 18:
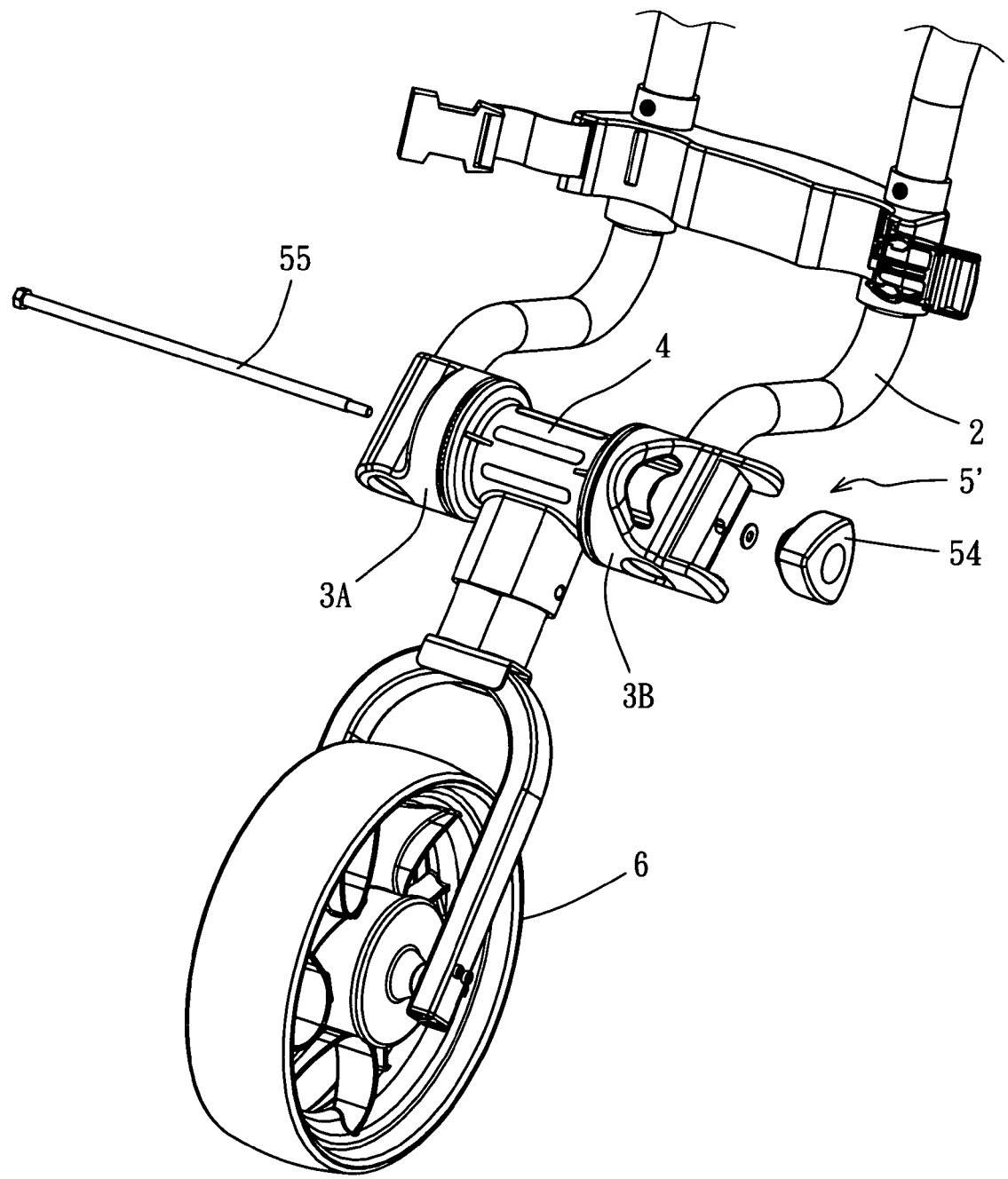
FIG. 18 is an exploded perspective view of a fourth embodiment of a golf cart front-wheel collapsing device in the present invention; and, FIG. 19 is a front cross-sectional view of the fourth embodiment of a golf cart front-wheel collapsing device in the present invention.
Figure 19:
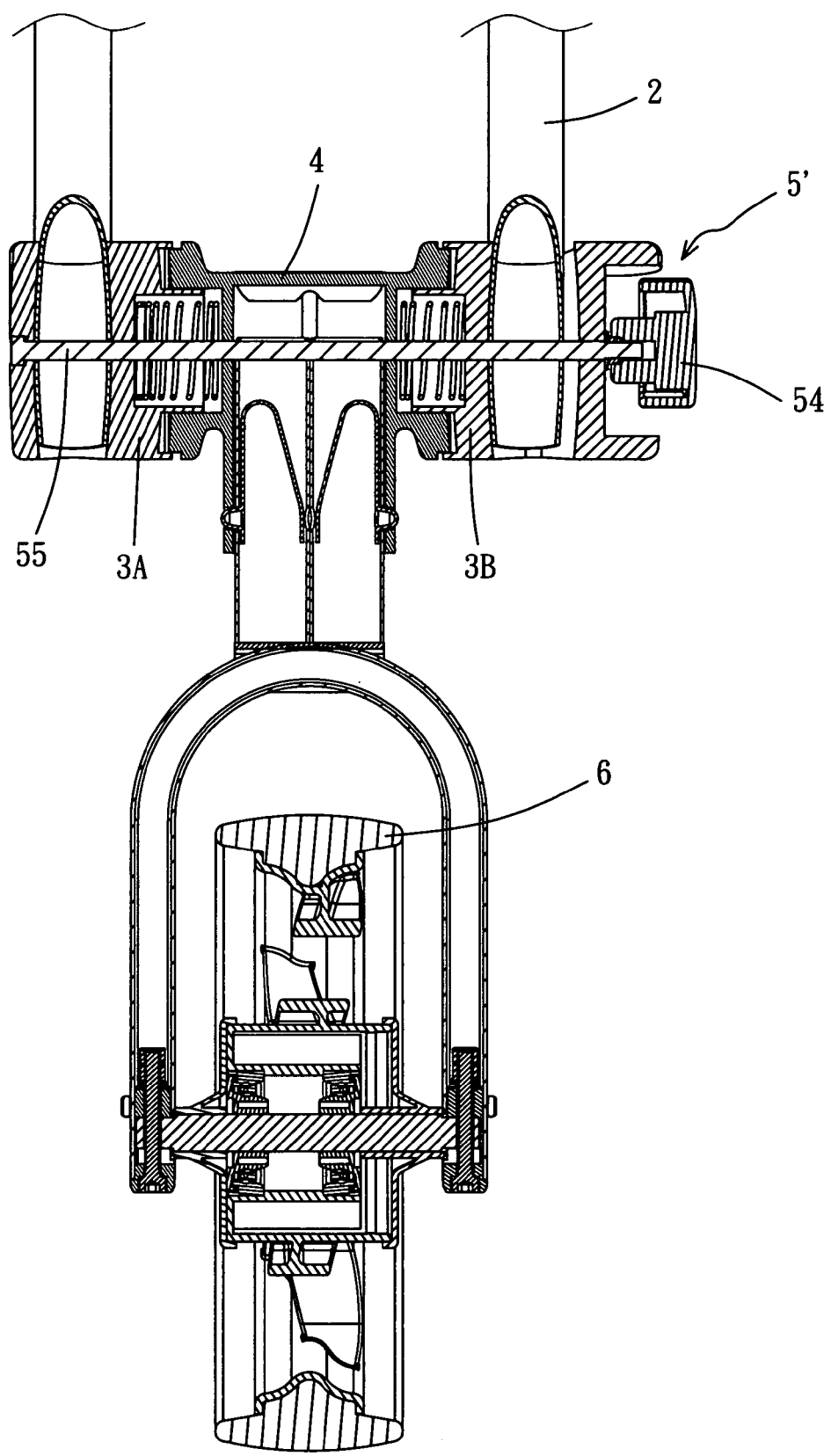

As shown in FIG. 14, a bottom supporter 22 as an independent component can be added on the upper part of the bent portion of the lower tubes 2, replacing the horizontal stage 21. Then the front wheel 6 and its collapsing device is located under the bottom supporter 22, which can be folded to make the collapsed size of the device smaller without the horizontal stage 21, forming a second embodiment of the front-wheel collapsing device in the present invention, Further, FIG. 17 shows a third embodiment of a front-wheel collapsing device applied to a golf cart with a single tube by altering the intermediate portion of the single tube with a two-tubes structure, Then a golf cart may have the same front-wheel collapsing device in the present invention;

Moreover, FIGS. 18 and 19 show a fourth embodiment of a golf cart front-wheel collapsing device, which has the same structure as the first embodiment except that the switch 5' is composed of a rotatable button 54 and an elongate bar 55 screwed with the button 54. Then the rotatable button 54 is rotated tight or loose for engaging or disengaging the stationary annular gears 3A, 3B with or from the rotary cylindrical gear 4, in the same way as the first embodiment does.

While the preferred embodiments of the invention have been described above, it will be recognized and understood that various modifications may be made therein and the appended claims are intended to cover all such modifications that may fall within the spirit and scope of the invention.

What is claimed is:

1. A golf cart front-wheel collapsing device comprising:
   two parallel lower tubes fixed under a golf cart frame and having a lower end bent forward;
   two stationary annular gears having a hole for said lower tubes to pass through down;
   a rotary cylindrical gear positioned between said two stationary annular gears, a coil spring respectively fitted between each said stationary annular gear and said rotary cylindrical gear;
   a switch fixed in one of said two stationary annular gears and having a lateral elongate bar passing through said lower tubes, said two stationary annular gears and said rotary cylindrical gear, said two coil springs positioned between said two stationary annular gears and said rotary cylindrical gear and passed through by said elongate bar;
   a front wheel positioned below said rotary cylindrical gear;
   handling said switch engaging and disengaging of said two stationary annular gears with and from said rotary cylindrical gear so as to enable said front wheel folded in the space between said two lower tubes in collapsing said front-wheel collapsing device into a small size for convenience of storing and carrying a golf cart provided with said front-wheel collapsing device; at the same time said front-wheel collapsing device having an angle-adjusting function for said front wheel for fixing said front wheel at one of many angles against the ground, said front-wheel collapsing device also having the function of adjusting the height of the grip of a golf cart for suiting to users of different body heights;
   wherein, said rotary cylindrical gear has a cylinder extending down, and said cylinder receives a wheel supporter of said front wheel therein and said wheel supporter is secured stably therein by two V-shaped springs.

2. The golf cart front-wheel collapsing device as claimed in claim 1, wherein said bent portion of said two lower tubes has a horizontal state.

3. The golf cart front-wheel collapsing device as claimed in claim 1, wherein said two lower tubes respectively have a bottom supporter pivotally fixed on a lower end.

4. The golf cart front-wheel collapsing device as claimed in claim 1, wherein said two stationary annular gears respectively have a round hole and an oval hole for said two lower tubes to pass through down.

5. The golf cart front-wheel collapsing device as claimed in claim 1, wherein said two stationary annular gears respectively have a square hole and a rectangular hole.

6. The golf cart front-wheel collapsing device as claimed in claim 1, wherein said stationary annular gears and said rotary cylindrical gear respectively have their corresponding surfaces formed respectively with many annular continual teeth for engaging.

7. The golf cart front-wheel collapsing device as claimed in claim 1, wherein said switch has an eccentric trigger for pulling up and down for tightening or loosening said two stationary annular gears with or from said rotary cylindrical gear.

8. The golf cart front-wheel collapsing device as claimed in claim 1, wherein said switch is composed of a rotatable button and an elongate bar screwed with said rotatable button.

* * * * *